(12) United States Patent
Shimozono

(10) Patent No.: US 6,285,645 B1
(45) Date of Patent: *Sep. 4, 2001

(54) OPTICAL DEVICE

(75) Inventor: Hiroaki Shimozono, Tokyo (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/084,307

(22) Filed: May 26, 1998

(30) Foreign Application Priority Data

May 27, 1997 (JP) .................................................. 9-137175

(51) Int. Cl.⁷ ...................................................... G11B 7/00
(52) U.S. Cl. .......................................................... 369/112.24
(58) Field of Search ............................. 369/44.11, 44.14, 369/109–112, 112.24; 359/719

(56) References Cited

U.S. PATENT DOCUMENTS

| | | | |
|---|---|---|---|
| 4,765,723 | * 8/1988 | Takamura | ............................ 359/719 |
| 5,699,341 | * 12/1997 | Sugi et al. | ........................... 369/112 |
| 5,835,473 | * 11/1998 | Shimozono et al. | ................. 369/112 |
| 5,870,371 | 2/1999 | Tsuchiya et al. . | |
| 5,872,761 | 2/1999 | Sugi et al. . | |
| 5,875,167 | * 2/1999 | Katayama | ............................. 369/112 |
| 5,892,749 | 4/1999 | Yamanaka . | |
| 5,901,132 | 5/1999 | Choi . | |
| 5,933,401 | 8/1999 | Lee et al. . | |
| 5,956,312 | 9/1999 | Ishihara . | |
| 5,974,020 | * 10/1999 | Ju et al. | ................................ 369/112 |
| 6,097,691 | * 8/2000 | Shimozono | ........................... 369/112 |

FOREIGN PATENT DOCUMENTS

| | | |
|---|---|---|
| 64-25113 | 1/1989 | (JP) . |
| 4-28282 | 5/1992 | (JP) . |
| 7-72386 | 3/1995 | (JP) . |
| 8-179195 | 7/1996 | (JP) . |
| 9-43510 | 2/1997 | (JP) . |
| 9-81953 | 3/1997 | (JP) . |
| 9-306023 | 11/1997 | (JP) . |

* cited by examiner

Primary Examiner—Aristotelis M. Psitos
(74) Attorney, Agent, or Firm—Oblon, Spivak, McClelland, Maier & Neustadt, P.C.

(57) ABSTRACT

An optical device for recording or reading two optical disks 6, 7 in which the thickness of a transparent substrate of a first optical disk 6 is different from the thickness of a transparent substrate of a second optical disk 7 wherein the optical device has an objective lens 3 for collecting light from a first light source 1 and light from a second light source 4 onto data recording surfaces 6b, 7b by means of respective transparent substrates 6a, 7a of the optical disks 6, 7; an optical material 2 for forwarding the light from the first light surface 1 and the light from the second light source 1 and light from a second light source 4 before the lights reaches the objective lens 3, and an auxiliary lens 5 provided between the second light surface 4 and the optical material 2.

11 Claims, 7 Drawing Sheets

OPTICAL DEVICE

BACKGROUND OF THE INVENTION

1. Field of the Invention

The present invention relates to an optical device suitable for recording or reading optical disks such as CD (a compact disk) and DVD (a digital video disk).

2. Discussion of Background

There have been proposed optical devices for recording or reading DVD having a transparent substrate of 0.6 mm thick and CD having a transparent substrate of 1.2 mm thick by means of a single objective lens (JP-A-9-43510, JP-A-9-81953).

In a device disclosed in JP-A-9-43510, a divergence angle changing lens for changing a divergence angle of light from a laser light source is provided between the laser light source and an objective lens, and when DVD or CD is recorded or read, the divergence angle changing lens is moved along the optical axis depending on a thickness of a transparent substrate of DVD or CD whereby aberration is corrected.

In a device disclosed in JP-A-9-81953, a finite type objective lens is commonly used for DVD and CD, and when recording or reading is effected for DVD or CD, a laser light source is moved along the optical axis in response to a thickness of a transparent substrate of DVD or CD whereby aberration is corrected.

In the former device, when switching of mode is conducted from the recording or reading of DVD to the recording or reading of CD, aberration characteristics of the lens concerning light passing on the optical axis, in particular, a spherical aberration can be made substantially zero by moving the divergence angle changing lens along the optical axis. However, it required a mechanism to move the divergence angle changing lens. Further, aberration characteristics on light passing out of the optical axis, in particular, an off-axial coma aberration could not be satisfied.

In the later device, when switching of mode is conducted from the recording or reading of DVD to the recording or reading of CD, aberration characteristics of light passing on the optical axis, in particular, a spherical aberration can be made substantially zero by moving the light source along the optical axis to thereby change an object-image distance. However, this mechanism requires a mechanism for changing the object-image distance. Further, aberration characteristics on light passing out of the optical axis, in particular, an off-axial coma aberration could not be satisfied.

Since the above-mentioned conventional devices have a large off-axial coma aberration, the optical performance shows a large reduction when the light source, the objective lens and so on are positioned inclined from the optical axis or shifted from the optical axis. Accordingly, high accuracy was required in positioning the objective lens and other elements in assembling operations of the optical device, and therefore, productivity is decreased. Further, in the conventional device for which high accuracy is required in determination of the position of the objective lens or the other elements, gradual deterioration of the optical performance is caused due to the wearing of a moving mechanism for moving the lens or the light source, the wearing resulting an inclination of the objective lens and other elements from the optical axis or a shift thereof from the optical axis.

Further, since the conventional devices have a large off-axial coma aberration, an allowable range is narrow in determining the position of the objective lens, in particular, a shift from the optical axis in driving the objective lens through an autofocusing mechanism when the optical devices are actually operated. Therefore, the optical performance is reduced. Further, since the conventional optical devices have a moving mechanism, it is difficult to achieve size reduction and weight reduction.

SUMMARY OF THE INVENTION

It is an object of the present invention to provide an optical device which does not require a moving mechanism whereby size reduction and weight reduction can be achieved even in a case of recording or reading optical disks each having a transparent substrate of different thickness and which provides excellent productivity and aberration characteristics while a gradual change of an inclination of the light source, the lens and so on or a gradual change of a shift of these elements from the optical axis are minimized.

In accordance with the present invention, there is provided an optical device which comprises a first light source, a second light source, an objective lens for collecting light from the first light source and light from the second light source on data recording surfaces of optical disks through respective transparent substrates of the optical disks, and an auxiliary lens provided between the second light source and the objective lens.

Further, in accordance with the present invention, there is provided an optical device for recording or reading data in a data recording surface of an optical disk by collecting light from a light source on the data recording surface through an objective lens, a reflection light from the data recording surface being received by a light receiving element through the objective lens, the optical device being characterized in that a first light source and a second light source are provided as the light source; an auxiliary lens is provided in addition to the objective lens; a first optical disk and a second optical disk are provided as the optical disk wherein the thickness of a transparent substrate of the first optical disk is different from the thickness of a transparent substrate of the second optical disk;

wherein when data in respective data recording surfaces of the first and second optical disks are to be recorded or read;

the recording or reading of the data in the data recording surface of the first optical disk is effected by collecting the light from the first light source through the objective lens and the transparent substrate of the first optical disk in this order; and the recording or reading of the data in the date recording surface of the second optical disk is effected by collecting the light from the second light source through the auxiliary lens, the objective lens and the transparent substrate of the second optical disk in this order.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the optical device of the present invention, a plurality of light sources are provided, and in consideration of the thickness of a transparent substrate of a first optical disk, the aberration characteristics of an objective lens in either off-axis or on-axis to light from a first light source are optimized. Further, in consideration of the thickness of a transparent substrate of a second optical disk, the aberration characteristics in a combination of an auxiliary lens and the objective lens in either off-axis or on-axis to light from a second light source are optimized by using the auxiliary lens provided between the second light source and the objective lens. The optical system having the above-mentioned construction permits recording or reading the optical disks wherein the thickness of the transparent substrate of the first optical disk is different from the thickness of the transparent substrate of the second optical disk.

Figure 1:
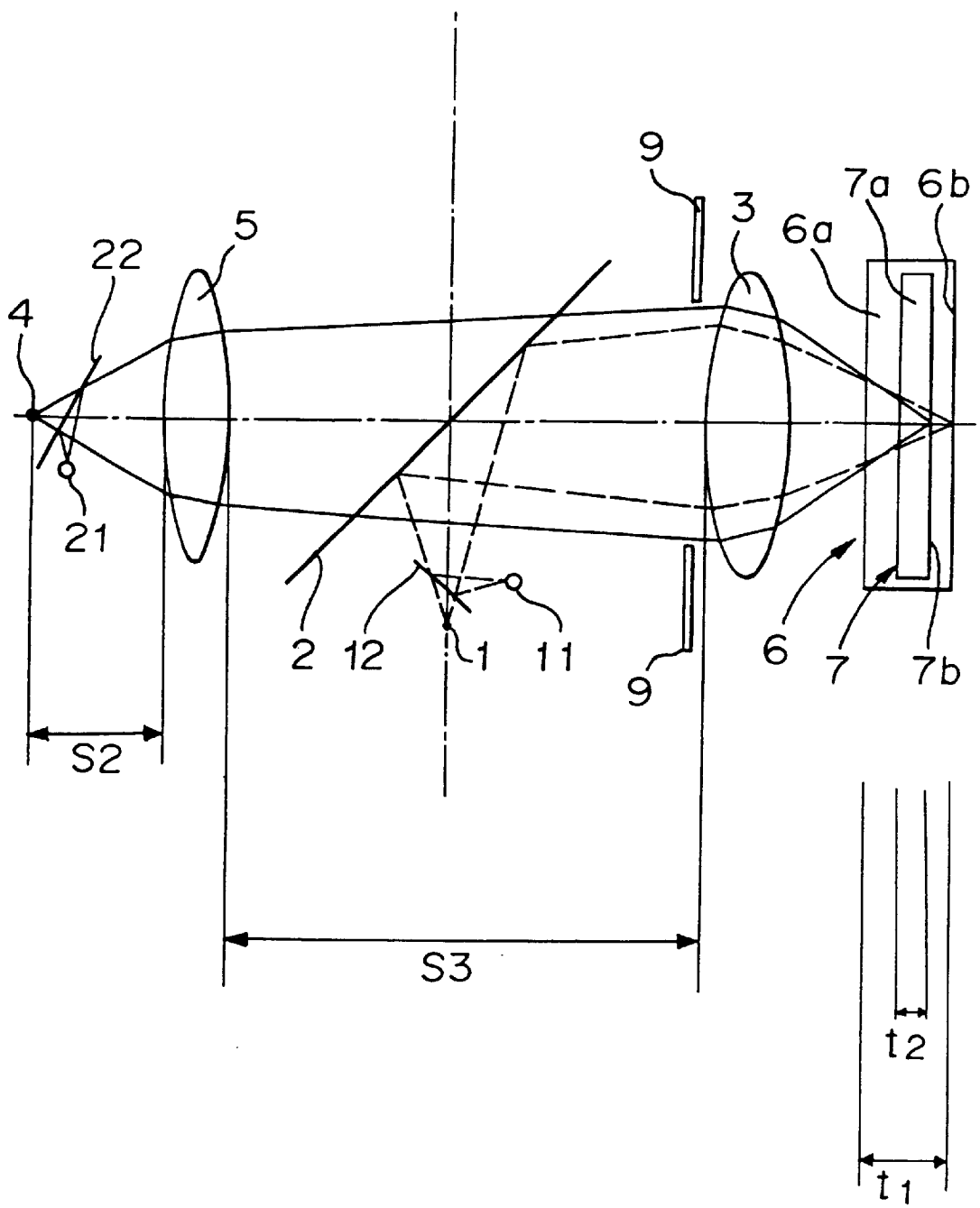
FIG. 1 is a diagram showing an embodiment of the optical device according to the present invention.

FIG. 1 is a diagram showing an embodiment of the optical device of the present invention. In FIG. 1, reference numeral 1 designates a first light source, numeral 2 designates an optical material (a half mirror), numeral 3 designates an objective lens, numeral 4 designates a second light source, numeral 5 designates an auxiliary lens, numeral 6 designates a first optical disk, numeral 6a designates a transparent substrate of the first optical disk 6 (hereinbelow, referred to as a first transparent substrate), numeral 6b designates a data recording surface of the first optical disk 6 (hereinbelow, referred to as a first data recording surface), numeral 7 designates a second optical disk, numeral 7a designates a transparent substrate of the second optical disk 7 (hereinbelow, referred to as a second transparent substrate), numeral 7b designates a data recording surface of the second optical disk 7 (hereinbelow, referred to as a second data recording surface), numeral 9 designates an aperture, numeral 11 designates a first light receiving element, numeral 12 designates an optical material for the first light receiving element 11, numeral 21 designates a second light receiving element, numeral 22 designates an optical material for the second light receiving element, a symbol S2 designates a distance on the optical axis from the second light source to the surface of the auxiliary lens 5 facing the second light source (a first surface), and a symbol S3 designates a distance on the optical axis from the surface of the auxiliary lens 5 facing the optical disk (a second surface) to the surface of the objective lens 3 facing the auxiliary lens 5 (the first surface). In the following description, units for dimensions such as distance, interval, length, thickness and so on indicate mm unless in particular described.

In the optical device shown in FIG. 1, a numerical aperture, when the first light source 1 is used, is smaller than a numerical aperture in use of the second light source 4.

Figure 2:
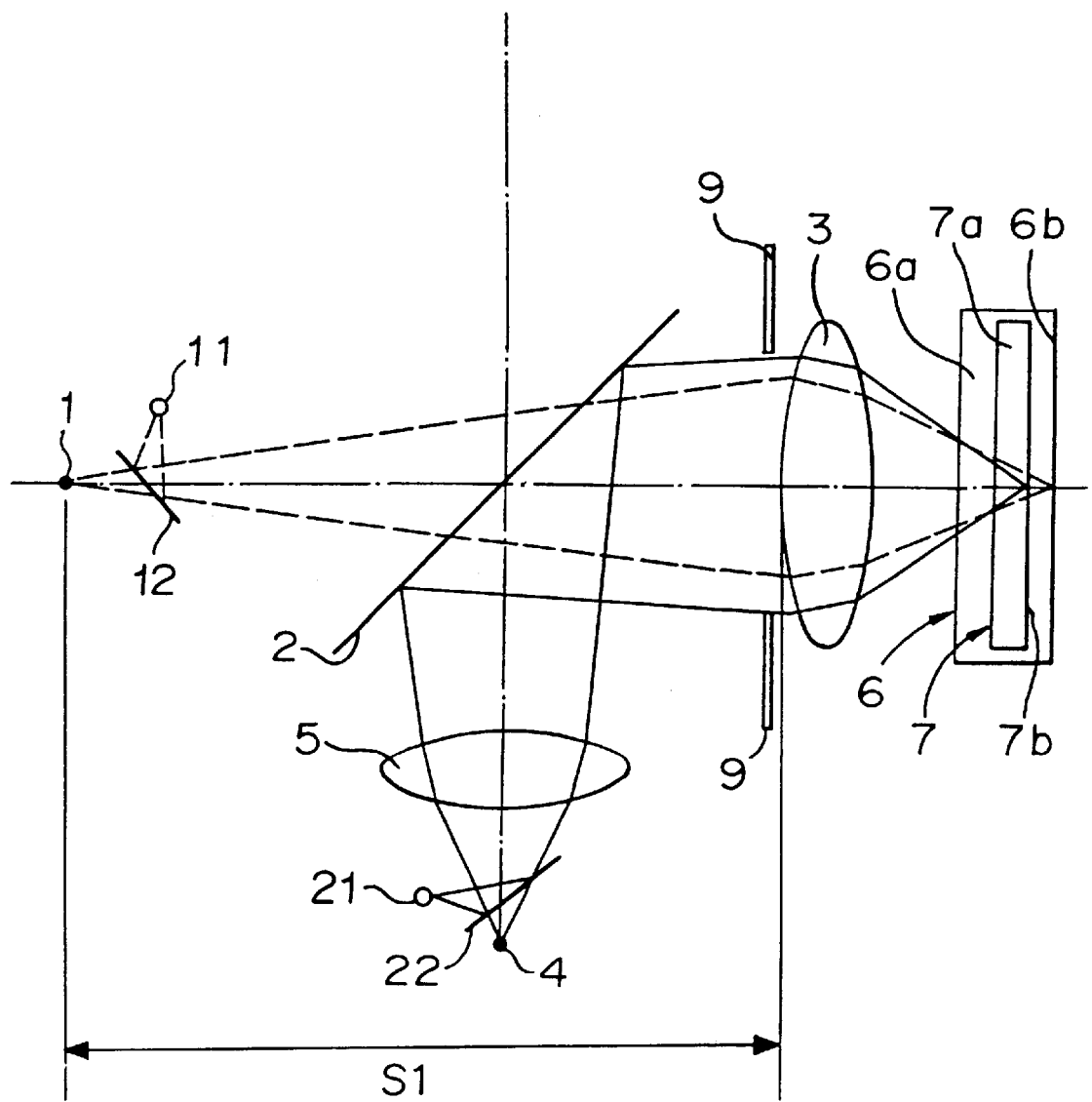
FIG. 2 is a diagram showing another embodiment of the optical device of the present invention.

FIG. 2 is a diagram showing an embodiment of the optical device which is different from that shown in FIG. 1 wherein S1 represents a distance on the optical axis from the first light source 1 to the surface (the first surface) of the objective lens 3 facing the first light source 1.

In FIGS. 1 and 2, light from the first light source 1 is passed through the optical material 12 for the first light receiving element 11, the optical material 2 and the objective lens 3 in this order to be introduced into and converged on the first data recording surface 6b. Light from the second light source 4 is passed through the optical material 22 for the light receiving element 21, the auxiliary lens 5, the optical material 2 and the objective lens 3 in this order to be introduced into and converged on the second data recording surface 7b. Namely, the optical system in the optical device of the present invention constitutes in its entirety a finite type optical system.

Further, marks representing digital signals are recorded in the first data recording surface 6b and the second data recording surface 7b. When the dimension of 1 bit for each mark is several μm or less, the optical system of the optical device of the present invention should have a diffraction-limited performance in order to obtain precise recording or reading.

The first light source 1 and the second light source 4 may be laser light sources, for instance. A laser light source for emitting beams having a wavelength of 780 nm may be used for CD and a laser light source for emitting beams having a wavelength of 650 nm may be used for DVD. Further, the wavelength of the laser light from the first light source 1 may be the same as the wavelength for the second light source 4. As an example of light sources having the same wavelength, there is a laser light source having a wavelength of 650 nm for CD and DVD. The wavelengths of the light sources are not limited to the above-mentioned values of 650 nm and 780

In the present invention, the objective lens 3 is optimized so that light from the first light source 1 is well converged on the first data recording surface 6b through the thickness of the first transparent substrate 6a. In other words, the aberration of the objective lens 3 is properly corrected under the conditions of the wavelength of light from the first light source 1, an object-image distance and the thickness of the first transparent substrate 6a, and the aberration characteristics of the optical system, in either off-axis or on-axis, for conducting the recording or reading of the first optical disk 6 by using the first light source 1 are optimized.

Further, a combination of the auxiliary lens 5 and the objective lens 3 is optimized with respect to the thickness of the second transparent substrate 7a so that light from the second light source 4 is well converged on the second data recording surface 7b. In other words, the aberration is properly corrected in the combination of the auxiliary lens 5 and the objective lens 3 under the conditions of the wavelength of light from the second light source 4, an object-image distance and the thickness of the second transparent substrate 7a. Further, the aberration characteristics of the optical system, either in off-axis or on-axis, for conducting the recording or reading of the second optical disk 7 by using the second light source 4 are optimized. Thus, there are obtainable preferable recording or reading of the first optical disk 6 and the second optical disk 7 wherein the thickness of the transparent substrate of the first optical disk 6 is different from the thickness of the transparent substrate of the second optical disk 7. The auxiliary lens 5 is determined so that the aberration in combination of the objective lens is optimum. The above-mentioned aberration characteristics are influenced by not only the thickness of the transparent substrates but also the diffractive index of the transparent substrate. However, the influence by the later is slight.

Generally, an optical system in an optical device for recording or reading an optical disk has an aberration, in particular, a spherical aberration of the third order. With respect to the above-mentioned optimization in the present invention, when data in the data recording surface of an optical disk are to be recorded or read, the absolute value in RMS value of the spherical aberration of the third order in the optical axis should be 0.03 $\lambda$ or less and an off-axial coma aberration in an image height of 0.1 mm should be 0.03 $\lambda$ or less where $\lambda$ represents a wavelength of light from the light source.

When the absolute value in RMS value of the spherical aberration of the third order is 0.03 $\lambda$ or less, accuracy for recording or reading is improved 0.1%-several % or more in comparison with a case of more than 0.03 $\lambda$. A further preferable range of the absolute value in RMS value of the spherical aberration of the third order is 0.01 $\lambda$ or less. In this case, accuracy for recording or reading is improved 0.5%-several % or more in comparison with a case that the absolute value in RMS value of the spherical aberration of the third order is more than 0.01 $\lambda$. Signs of RMS value of the spherical aberration of the third order are so determined as to be positive when the phase of a wavefront in a peripheral portion is ahead the phase of that on the optical axis and negative when the former is lag with respect to the later.

When the off-axial coma aberration in an image height of 0.1 mm is 0.03 $\lambda$ or less, an allowable range of an inclination or a shift of the light source, the auxiliary lens, the objective lens or the optical disk from the optical axis is expanded 0.1%-several % or more in comparison with a case of more than 0.03 $\lambda$. A preferable range of the off-axial coma aberration in an image height of 0.1 mm is 0.01 $\lambda$ or less. In this case, an allowable range is expanded 0.5%-several % or more in comparison with a case of more than 0.01 $\lambda$.

The objective lens 3 is of a finite type lens, and a combination of the objective lens 3 and the auxiliary lens 5 also constitutes a finite type lens. Such structure is employed because light from the light source which is located in a finite distance range with respect to the optical disk is converged on the data recording surface of the optical disk.

In the present invention, when data in respective data recording surfaces of the first optical disk 6 and the second optical disk 7 wherein the thickness of the transparent substrates are different from each other are to be recorded or read it is preferable that, $t_1 > t_2$ where t1 represents the thickness of the first transparent substrate 6a and $t_2$ represents the thickness of the second transparent substrate 7a. In the satisfaction of the above-mentioned condition, correction of aberration can be achieved to the auxiliary lens 5 by using an aspheric coefficient of a lower order than the fourth order or less. Accordingly, the shape of the auxiliary lens 5 is not complicated whereby the processing to the auxiliary lens 5 is not difficult and productivity can be improved.

Further, it is preferable to satisfy at least one of the following conditions (A) and (B):

$$0.05 \leq |\beta_1| \leq 0.3 \tag{A}$$

and, $$0.05 \leq |\beta_2| \leq 0.3 \tag{B}$$

where $\beta_1$ represents a lateral magnification of the objective lens in correspondence with a combination of the first light source 1 and the first transparent substrate 6a and $\beta_2$ represents a lateral magnification of the objective lens 3 and the auxiliary lens 5 in correspondence with a combination of the second light source 4 and the second transparent substrate 7a.

In a case that $0.05 \leq |\beta_1|$ or $0.05 \leq |\beta_2|$ is not satisfied, the object-image distance becomes too long so that miniaturization of the optical device becomes difficult.

Further, in a case where $|\beta_1| \leq 0.3$ or $|\beta_2| \leq 0.3$ is not satisfied, correction of aberration becomes difficult.

Further, it is preferable that 8 mm $\leq$ S2 $\leq$ 25 mm. When S2 is less than 8 mm, correction of aberration becomes difficult. On the other hand, when S2 exceeds 25 mm, miniaturization of the optical device becomes difficult.

Figure 3:
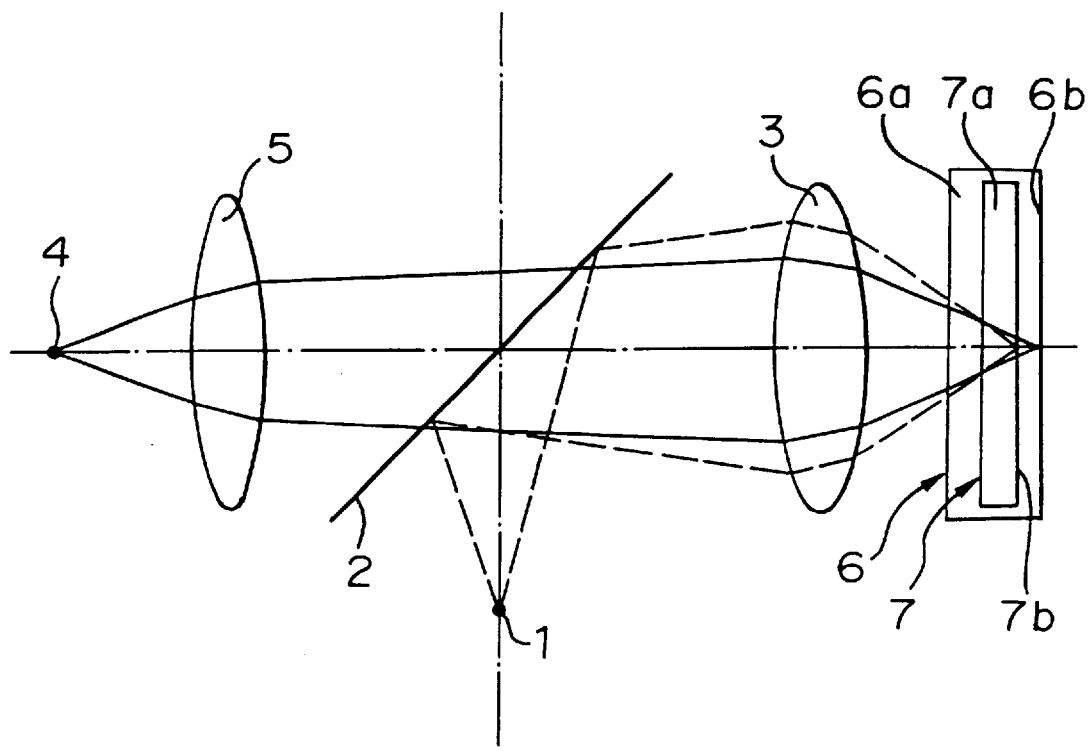
FIG. 3 is a diagram showing an another embodiment of the optical device of the present invention.

FIG. 3 is a diagram showing a separate embodiment of the optical device from the embodiment shown in FIG. 1. The optical device of this embodiment provides an optical path wherein a numerical aperture in use of the first light source 1 is larger than a numerical aperture in use of the second light source 4. In the optical device in FIG. 3, arrangements of the first light source 1, the second light source 4, the optical material 2, the auxiliary lens 5 and the objective lens 3 are the same as those of the optical device shown in FIG. 1. In FIG. 3, the aperture 9, the first light receiving element 11, the optical material 12 for the first light receiving element 11, the second light receiving element 21 and the optical material 22 for the second light receiving element 21 are omitted. However, it is preferable that these elements are located at the same positions as in FIG. 1.

The optical material 2, the optical material 12 for the first light receiving element 12 and the optical material 22 for the second light receiving element 21 may be half mirrors. In the embodiments shown in FIGS. 1, 2 and 3, a half mirror is used for the optical material 2. In FIG. 1, the light from the first light source 1 is reflected by the half mirror (optical material 2) to be incident into the objective lens 3 and the light from the second light source 4 is transmitted through the auxiliary lens 5 and then, transmitted through the half mirror to be incident into the objective lens 3.

The optical material 2 is provided depending on requirement. In the embodiments shown in FIGS. 1 and 3, the optical material 2 may be omitted and the first light source 1 may be provided at a position so that the light from the first light source 1 directly enters into the objective lens 3. Further, in the embodiment shown in FIG. 2, the optical material 2 may be omitted and the second light source 4 and the auxiliary lens 5 may be arranged at the positions so that the light from the second light source 4 enters into the objective lens 3 after passing through the auxiliary lens 5. In a case of using the optical material 2, the optical material 2 is not limited to the half mirror but may be a prism or the like.

In the embodiments shown in FIGS. 1 and 2, half mirrors are used for the optical material 12 for the first light receiving element 11 and the optical material 22 for the second light receiving element 21 so that each reflection light from the half mirrors is introduced into each of the light receiving elements to read data in the data recording surface of the optical disks. However, the optical material 12 for the first light receiving element 11 and the optical material 22 for the second light receiving element 21 are not limited to the half mirrors. Further, means for reading data in the data recording surface of each of the optical disks to supply the data to each of the light receiving elements is not limited to means as shown in FIGS. 1 and 2.

The aperture 9 functions to change a numerical aperture (NA). The reason why the aperture 9 is provided is that when a numerical aperture in use of the first optical disk 6 is different from a numerical aperture in use of the second optical disk 7 and when recording or reading of data is to be conducted, the numerical aperture has to be adjusted by the aperture 9. When the numerical aperture in use of the first optical disk 6 is the same as the numerical aperture in use of the second optical disk 7, the aperture 9 is generally unnecessary. A mechanical aperture or an optical aperture may be used for the aperture 9. However, the aperture 9 is not in particular limited thereto.

A finite type lens is usable for the objective lens 3. However, the finite type objective lens includes an objective lens which is so designed as an infinite type and is usable for the finite type. In FIGS. 1, 2 and 3, the objective lens 3 and the auxiliary lens 5 are respectively constituted by a single lens. However, the present invention is not limited to use a single lens but the objective lens 3 and the auxiliary lens 5 can respectively be constituted by a plurality of lenses.

Description has been made as to recording or reading two kinds of optical disk. However, the present invention is not limited thereto and recording or reading can be conducted to three or more kinds of optical disk wherein the thickness of these transparent substrate are all different. Further, the optical disk used in the present invention is not limited to DVD or CD but may be another kind of optical disk.

When recording or reading is effected to at least two different kinds of optical disk in the present invention, two light sources each having the same wavelength can be used wherein wavelengths of light may be changed for optical disks, or a plurality of light sources can be used wherein wavelengths of light can be changed for the optical disks.

As material used for the auxiliary lens 5 and the objective lens 3, synthetic resin is generally used. However, the material is not limited to the synthetic resin, and glass may be used. Further, the optical device of the present invention may be provided with an autofocusing means for the objective lens depending on requirement.

An example of designing in an optical sense the optical device of the present invention will be described. First, the objective lens 3 is designed on the premise of using the first light source 1 so that an on-axial spherical aberration and an off-axial coma aberration are minimized as possible in consideration of the thickness of the first transparent substrate 6a.

Then, the auxiliary lens 5 is designed on premise of using the second light source 4 so that an on-axial spherical aberration and an off-axial coma aberration are minimized as possible in consideration of the thickness of the second transparent substrate 7a when the auxiliary lens 5 is combined with the objective lens.

The design of the optical device allows recording or reading of optical disks having transparent substrates of different thickness by changing the light sources under conditions that the spherical aberration and the coma aberration have been well adjusted.

Now, the present invention will be described in detail with reference to examples. However, it should be understood that the present invention is by no means restricted by such specific examples.

EXAMPLE 1

Example 1 is a case of $t_1 > t_2$.

The optical device shown in FIG. 1 was prepared on premise that CD would be used for the first optical disk 6, DVD would be used for the second optical disk 7, and recording or reading of CD and DVD would be conducted.

A laser light source for emitting light of a wavelength of 650 nm was used for the first light source 1. Light from the first light source 1 was reflected by the half mirror (the optical material 2) and passed through the objective lens 3 to be collected onto the data recording surface of CD.

A laser light source for emitting light of a wavelength of 650 nm was used for the second light source 4. Specifications of the auxiliary lens 5 were determined so that the auxiliary lens 5 and the objective lens 3 constituted a finite type lens. Light from the second light source 4 is passed through the auxiliary lens 5, the half mirror (the optical material 2) and the objective lens 3 in this order to be collected onto the data recording surface of DVD.

The objective lens 3 was designed as follows.

The objective lens 3 was designed to have a diffraction-limited performance and a NA of 0.60 so that it was optimally used under the condition that the thickness of the transparent substrate of the optical disk (CD) was 1.2 mm and the refractive index of the transparent substrate of the optical disk was 1.58. In recording or reading CD, the objective lens was adjusted to have a NA of 0.38.

Table 1 shows specifications and coefficients of the objective lens 3. In Table 1, f indicates a focal distance, L indicates a distance from the first light source 1 to the first data recording surface 6b (object image distance), P indicates a distance between the face of the objective lens 3 facing CD and the face of the CD facing the objective lens 3 (working distance), d indicates the thickness at the center of the objective lens 3 and n indicates the refractive index of the objective lens 3. An aspheric configuration of the objective lens 3 is expressed by Formula 1.

[Formula 1]

$$Z_j = (1/r_j)h^2/(1+[1-(1+k_j)(1/r_j)^2 h^2)])^{0.5}) + \Sigma a_{i,j} h^i$$

In Formula 1, i is 2, 4, 6, 8 or 10; j is 1 or 2; h is a height from the optical axis; $z_j$ is a distance from a plane in contact with the apex of a j th aspheric surface to a point having a height h on the aspheric surface; and $r_j$, $k_j$ and $a_{i,j}$ are respectively coefficients of the j th surface.

TABLE 1

| | |
|---|---|
| f=5.789 | $a_{2,1}$=−4.3537651×10$^{-1}$ |
| S1=35.17 | $a_{2,2}$=3.25400743×10$^{-2}$ |
| L=46.33 | $a_{4,1}$=−5.67051159×10$^{-5}$ |
| P=1.42 | $a_{4,2}$=4.69488004×10$^{-3}$ |
| d=8.54 | $a_{6,1}$=1.78355902×10$^{-4}$ |
| n=1.49005 | $a_{6,2}$=−5.19210306×10$^{-4}$ |
| $r_1$=0.8679995 | $a_{8,1}$=0 |
| $r_2$=−2.474526 | $a_{8,2}$=0 |
| $k_1$=−0.9962258 | $a_{10,1}$=0 |
| $k_2$=−4.630266 | $a_{10,2}$=0 |

The auxiliary lens 5 was designed so that the optical system in combination of the objective lens 3 and the auxiliary lens 5 specified in Table 1 was optimally used under the conditions that the thickness of the transparent substrate of the optical disk (DVD) was 0.6 mm and the refractive index of the transparent substrate of the optical disk was 1.58 and had a diffraction-limited performance. The NA of the optical system in combination of the objective lens 3 and the auxiliary lens 5 in Table 1 is determined to be 0.60.

Table 2 shows specifications and coefficients of the auxiliary lens 5. In Table 2, P indicates a distance between the surface of the objective lens 3 facing DVD and the surface of the DVD facing the objective lens 3 (working distance), d indicates the thickness at the center of the auxiliary lens, and n indicates the refractive index of the auxiliary lens 5.

Further, an aspheric configuration of the auxiliary lens 5 can be expressed by Formula 1 in the same manner as the objective lens 3.

Figure 4:
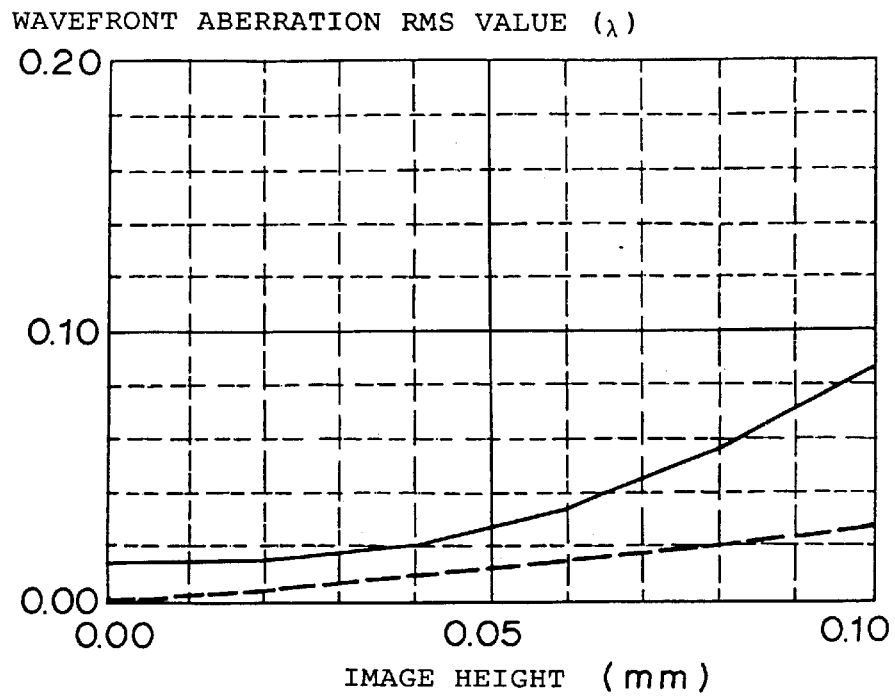
FIG. 4 is a characteristic diagram showing an off-axial wavefront aberration of an optical system for CD in the first embodiment.
Figure 5:
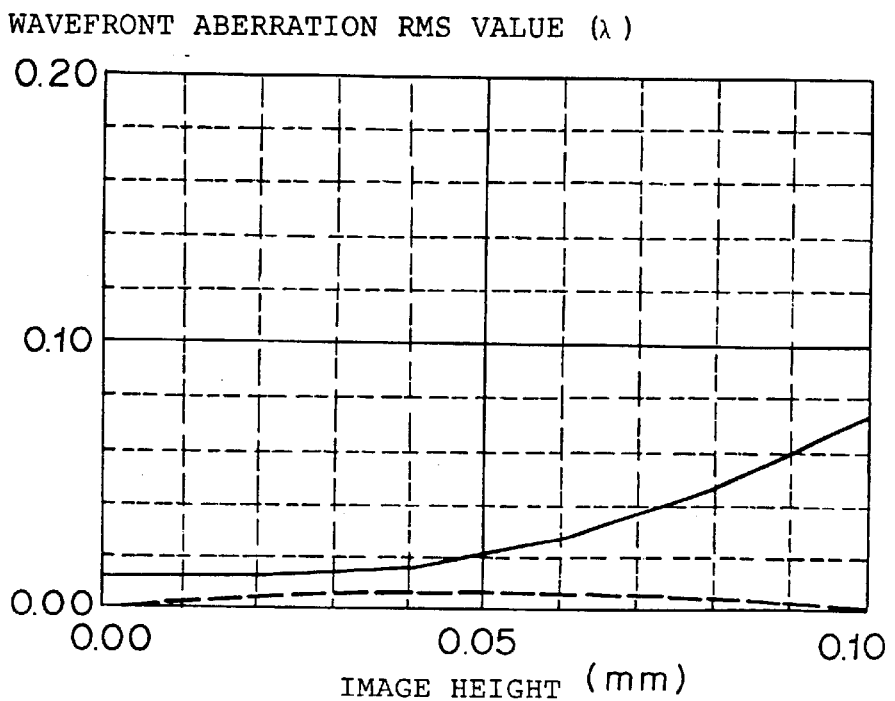
FIG. 5 is a characteristic diagram showing an off-axial wavefront aberration of an optical system for DVD in the first embodiment.

FIG. 4 shows an off-axial wavefront aberration characteristic of the optical system for CD. In FIG. 4, a solid line shows a wavefront aberration including all kinds of aberration. A broken line shows only an off-axial coma aberration in an off-axial wavefront aberration. FIG. 5 shows an off-axial wavefront aberration characteristic of the optical system for DVD wherein the meaning of a solid line or a broken line is the same as that in FIG. 4. In other aberration characteristics diagrams, the meaning of solid lines or broken lines is the same as that in FIG. 4. The aberration characteristic diagram and aberration values in Table 4 on these examples are all based on calculated values.

RMS values (calculated values) of a spherical aberration of the third order and RMS values (calculated values) of an off-axial coma aberration in an image height of 0.1 mm are shown in Table 9, and those for examples 2–4 are also shown in Table 9. In Table 9, the optical system for DVD in Examples 1, 3 and 4 is the optical system in combination of the objective lens 3 and the auxiliary lens 5, and the optical system for CD in Example 2 is the optical system in combination of the objective lens 3 and the auxiliary lens 5.

The lateral magnification of the optical system in Example 1 and the diameter of clear aperture (the largest diameter for passing light) of the objective lens 3 are shown in Table 10, and those in Examples 2–4 are also shown in Table 10.

The objective lens 3 and the auxiliary lens 5 having the shape as in Example 1 were prepared by injection-molding a resinous material and the optical device of Example 1 was manufactured. When recording or reading was conducted to DVD and CD by using the optical device, accurate recording or reading could be performed for both DVD and CD.

TABLE 2

| | |
|---|---|
| S2=19.5 | $a_{2,1}=-9.09748723\times10^{-2}$ |
| S3=13.6 | $a_{2,2}=-5.65236694\times10^{-4}$ |
| P=1.60 | $a_{4,1}=1.57045942\times10^{-4}$ |
| d=5.9 | $a_{4,2}=-2.07656730\times10^{-4}$ |
| n=1.49005 | $a_{6,1}=5.51268870\times10^{-4}$ |
| $r_1$=−25.47741 | $a_{6,2}=2.24036936\times10^{-4}$ |
| $r_2$=−51.30413 | $a_{8,1}=-6.47221205\times10^{-4}$ |
| $k_1$=−131.469 | $a_{8,2}=-4.26523371\times10^{-5}$ |
| $k_2$=43.71088 | $a_{10,1}=1.23706023\times10^{-4}$ |
| | $a_{10,2}=2.63975176\times10^{-6}$ |

EXAMPLE 2

Example 2 is a case of $t_1<t_2$.

The optical device shown in FIG. 3 was manufactured on premise that DVD would be used for the first optical disk 7; CD would be used for the second optical disk 6; and recording or reading was conducted for CD and DVD.

A laser light source of a wavelength of 650 nm was used for the first light source 1. Light from the first light source 1 was reflected by the half mirror (the optical material 2) and passed through the objective lens 3 to be collected on the data recording surface of DVD.

A laser light source of a wavelength of 650 nm was used for the second light source 4. Specifications of the auxiliary lens 5 were determined so that the auxiliary lens 5 and the objective lens 3 constituted a finite type lens. Light from the second light source 4 is passed through the auxiliary lens 5, the half mirror (the optical material 2) and the objective lens 3 in this order to be collected on the data recording surface of CD.

The objective lens 3 was designed as follows.

The objective lens was designed so that it was optimally used under the conditions that the thickness of the transparent substrate of the optical disk (DVD) was 0.6 mm and the refractive index of the transparent substrate of the optical disk was 1.58; it has a diffraction-limited performance and was adjusted to have a NA of 0.60.

For recording or reading CD, the auxiliary lens 5 which was optimized in the combination of the objective lens 3 was used wherein the objective lens 3 was adjusted to have a NA of 0.38. The aperture of an opening-changeable type was provided between the optical material 2 and the objective lens 3. Further, in the same manner as Example 1, an aspheric configuration of the objective lens 3 can be expressed by Formula 1, and specifications and coefficients of the objective lens are shown in Table 3.

TABLE 3

| | |
|---|---|
| f=4.165 | $a_{2,1}=-4.18067548\times10^{-1}$ |
| S1=35.17 | $a_{2,2}=3.41570216\times10^{-2}$ |
| L=42.37 | $a_{4,1}=-6.90821617\times10^{-3}$ |
| P=1.60 | $a_{4,2}=2.88574509\times10^{-2}$ |
| d=5.00 | $a_{6,1}=-1.5955239\times10^{-4}$ |
| n=1.49005 | $a_{6,2}=-1.85086556\times10^{-3}$ |
| $r_1$=0.8114197 | $a_{8,1}=0$ |
| $r_2$=−2.964479 | $a_{8,2}=0$ |
| $k_1$=−0.9605556 | $a_{10,1}=0$ |
| $k_2$=−0.8585396 | $a_{10,2}=0$ |

The auxiliary lens 5 was designed as follows.

The auxiliary lens 5 was designed so that the optical system in combination of the objective lens 3 specified in Table 3 and the auxiliary lens 5 was optimally used under the condition that the thickness of the transparent substrate of the optical disk (CD) was 1.2 mm and the refractive index of the transparent substrate of the optical disk was 1.58 and it had a diffraction-limited performance. The NA of the optical system in combination of the objective lens 3 (Table 3) and the auxiliary lens 5 was determined to be 0.38. Table 4 shows specifications and coefficients of the auxiliary lens 5.

In Table 4, P indicates a distance between the surface of the objective lens 3 facing CD and the surface of CD facing the objecting lens 3 ( working distance), d indicates the thickness at the center of the auxiliary lens 5 and n indicates the refractive index of the auxiliary lens 5. An aspheric configuration of the auxiliary lens 5 is expressed by Formula 1 in the same manner as the objective lens 3.

Figure 6:
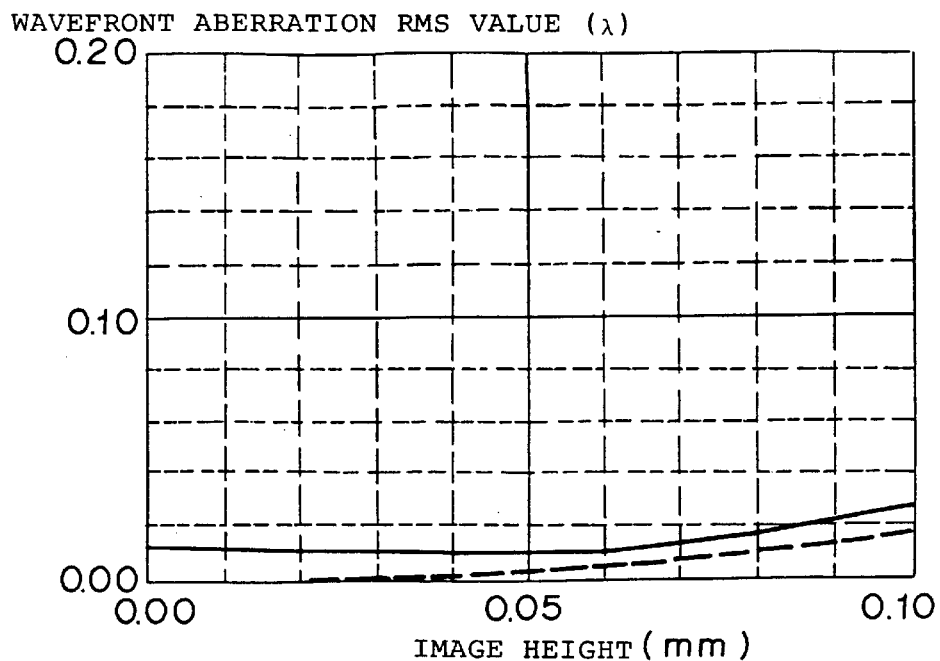
FIG. 6 is a characteristic diagram showing an off-axial wavefront aberration of an optical system for CD in the second embodiment.
Figure 7:
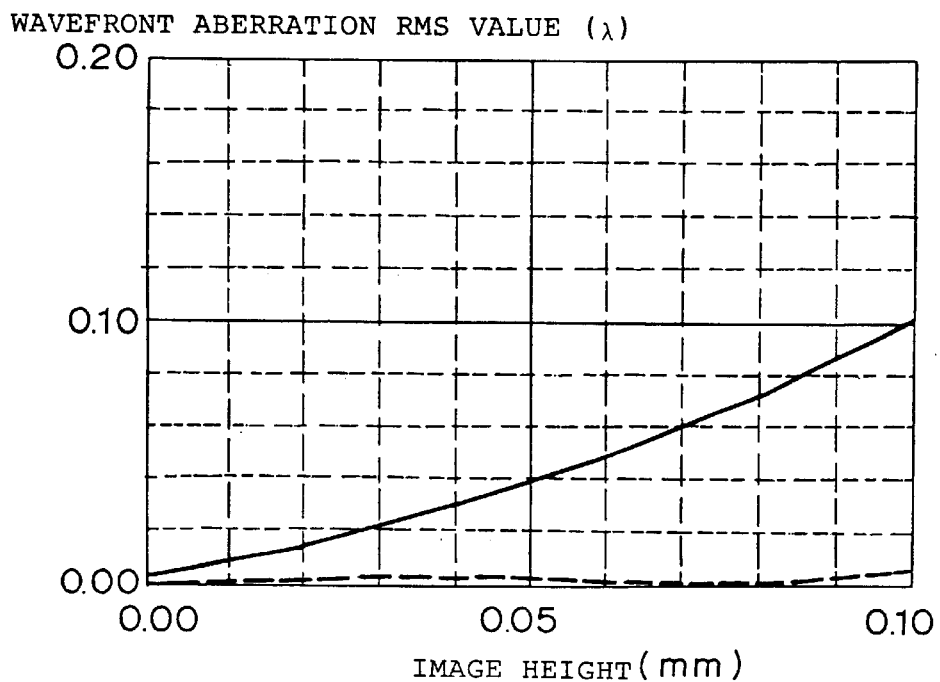
FIG. 7 is a characteristic diagram showing an off-axial wavefront relation of an optical system for DVD in the second embodiment.

FIG. 6 shows an off-axial wavefront aberration characteristic of the optical system for CD. FIG. 7 shows an off-axial wavefront aberration characteristic of the optical system for DVD.

The objective lens 3 and the auxiliary lens 5 each having a shape as described in Example 2 were prepared by injection-molding a resinous material and the optical device as in Example 2 was prepared. Recording or reading was conducted for DVD and CD by using the optical device.

As a result, correct recording and reading could be obtained.

TABLE 4

| | |
|---|---|
| S2=11.7 | $a_{2.1}=0$ |
| S3=10.23 | $a_{2.2}=0$ |
| P=1.42 | $a_{4.1}=9.15897996 \times 10^{-3}$ |
| d=4.85 | $a_{4.2}=5.59047272 \times 10^{-3}$ |
| n=1.49005 | $a_{6.1}=-1.63691335 \times 10^{-2}$ |
| $r_1=-9.031236$ | $a_{6.2}=-9.23438698 \times 10^{-4}$ |
| $r_2=-14.97221$ | $a_{8.1}=1.18851488 \times 10^{-2}$ |
| $k_1=-12.39707$ | $a_{8.2}=1.67871247 \times 10^{-5}$ |
| $k_2=80.09943$ | $a_{10.1}=-2.75849175 \times 10^{-3}$ |
| | $a_{10.2}=3.14649530 \times 10^{-4}$ |

EXAMPLE 3

Example 3 is a case of $t_1 > t_2$.

An optical device was prepared in accordance with the same specifications as in Example 1 except that the wavelength of the first light source 1 was changed to 780 nm; the wavelength of the second light source 4 was changed to 650 nm, and specifications of the objective lens 3 and the auxiliary lens 5 were changed.

The objective lens 3 was designed as follows.

The objective lens 3 was designed so that it was optimally used under the conditions that the thickness of the transparent substrate of the optical disk (CD) was 1.2 mm; the refractive index of the transparent substrate of the optical disk was 1.58; it had a diffraction-limited performance; and NA was adjusted to be 0.60.

In recording or reading CD, the numerical aperture NA of the objective lens is adjusted to 0.45. An aspheric configuration of the objective lens 3 is expressed by Formula 1, and specifications and coefficients of the objective lens are shown in Table 5.

TABLE 5

| | |
|---|---|
| f=4.01 | $a_{2.1}=0.052178042$ |
| S1=30.00 | $a_{2.2}=0.095596447$ |
| L=37.080 | $a_{4.1}=0$ |
| P=1.00 | $a_{4.2}=0$ |
| d=5.50 | $a_{6.1}=0$ |
| n=1.519 | $a_{6.2}=0$ |
| $r_1=3.71792$ | $a_{8.1}=0$ |
| $r_2=-1.821594$ | $a_{8.2}=0$ |
| $k_1=-0.1498295$ | $a_{10.1}=0$ |
| $k_2=-3.673417$ | $a_{10.2}=0$ |

Figure 8:
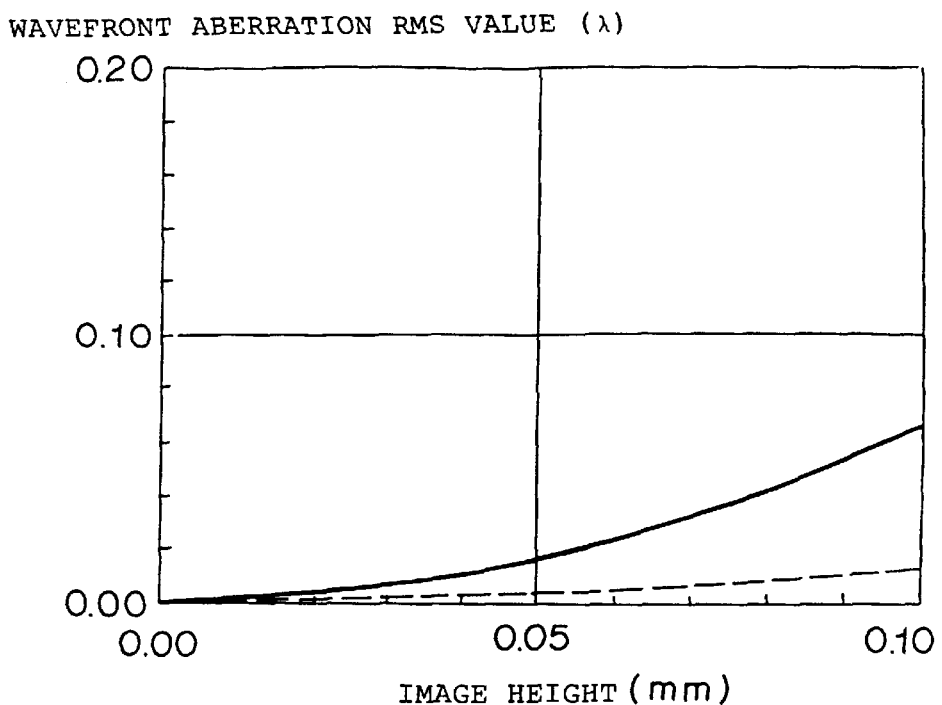
FIG. 8 is a characteristic diagram showing an off-axial wavefront aberration of an optical system for CD in the third embodiment.
Figure 9:
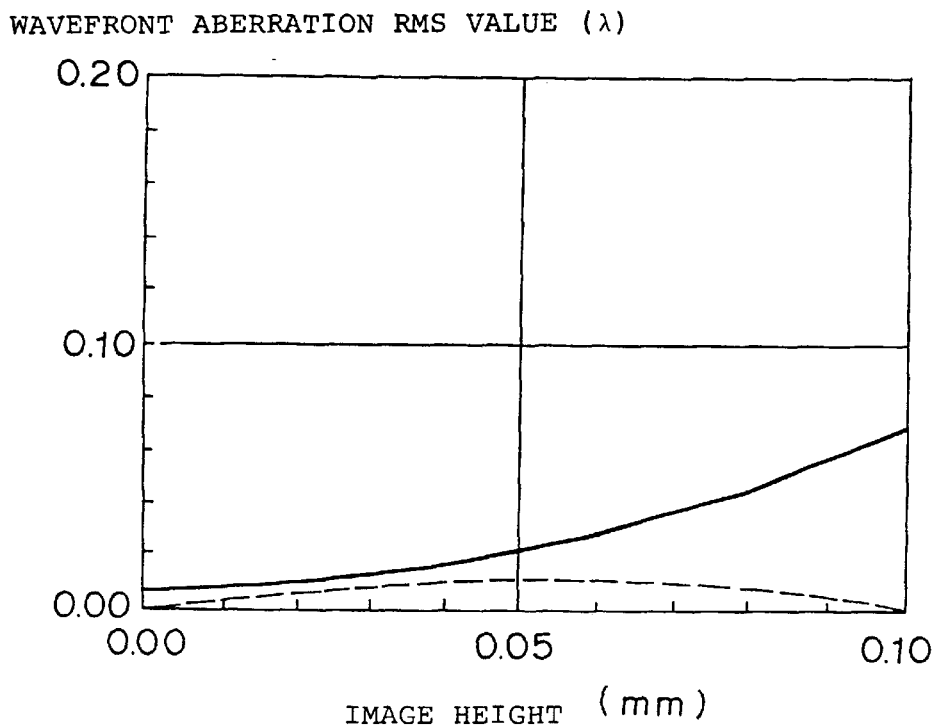
FIG. 9 is a characteristic diagram showing an off-axial wavefront aberration of an optical system for DVD in the third embodiment.

An aspheric configuration of the auxiliary lens 5 is expressed by Formula 1, and specifications and coefficients of the auxiliary lens are shown in Table 6. FIG. 8 shows an off-axial wavefront aberration characteristic of the optical system for CD, and FIG. 9 shows an off-axial wavefront aberration characteristic of the optical system for DVD.

The objective lens 3 and the auxiliary lens 5 each having the same shape as in Example 3 were prepared by injection-molding a resinous material and the optical device of Example 3 was manufactured. When recording or reading was conducted to DVD and CD by using the optical device, correct recording and reading was obtained for the both DVD and CD.

TABLE 6

| | |
|---|---|
| S2=15.00 | $a_{2.1}=0.10751953$ |
| S3=7.00 | $a_{2.2}=0.29903014$ |
| P=1.00 | $a_{4.1}=0$ |
| d=3.0 | $a_{4.2}=0$ |
| n=1.522 | $a_{6.1}=0$ |
| $r_1=-7.717511$ | $a_{6.2}=0$ |
| $r_2=-1.631651$ | $a_{8.1}=0$ |
| $k_1=-12.36958$ | $a_{8.2}=0$ |
| $k_2=-1.074359$ | $a_{10.1}=0$ |
| | $a_{10.2}=0$ |

EXAMPLE 4

Example 4 is a case of $t_1 > t_2$.

An optical device was prepared in the same manner as in Example 3 except that specifications of the objective lens 3 and the auxiliary lens 5 were changed.

The objective lens 3 was designed as follows.

The objective lens 3 was designed so that it was optimally used under the conditions that the thickness of the transparent substrate of the optical disk (CD) was 1.2 mm; the refractive index of the transparent substrate of the optical disk was 1.58; it had a diffraction-limited performance; and NA was determined to be 0.60. In recording or reading CD, the NA of the objective lens is adjusted to 0.45. An aspheric configuration of the objective lens 3 is expressed by Formula 1, and specifications and coefficients of the objective lens are shown in Table 7.

TABLE 7

| | |
|---|---|
| f=3.78 | $a_{2.1}=0.10150884$ |
| S1=18.00 | $a_{2.2}=0.072041606$ |
| L=25.70 | $a_{4.1}=0$ |
| P=1.00 | $a_{4.2}=0$ |
| d=5.50 | $a_{6.1}=0$ |
| n=1.519 | $a_{6.2}=0$ |
| $r_1=5.061855$ | $a_{8.1}=0$ |
| $r_2=-1.709934$ | $a_{8.2}=0$ |
| $k_1=0.5082936$ | $a_{10.1}=0$ |
| $k_2=-3.780523$ | $a_{10.2}=0$ |

An aspheric configuration of the auxiliary lens 5 is expressed by Formula 1, and specifications and coefficients of the auxiliary lens 5 are shown in Table 8.

Figure 10:
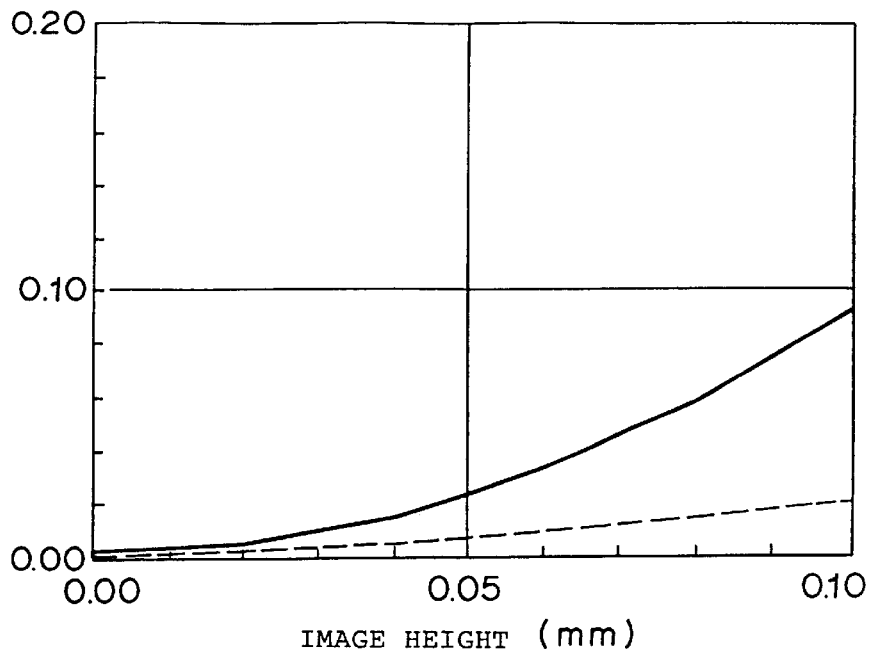
FIG. 10 is a characteristic diagram showing an off-axial wavefront aberration of an optical system for CD in the fourth embodiment.
Figure 11:
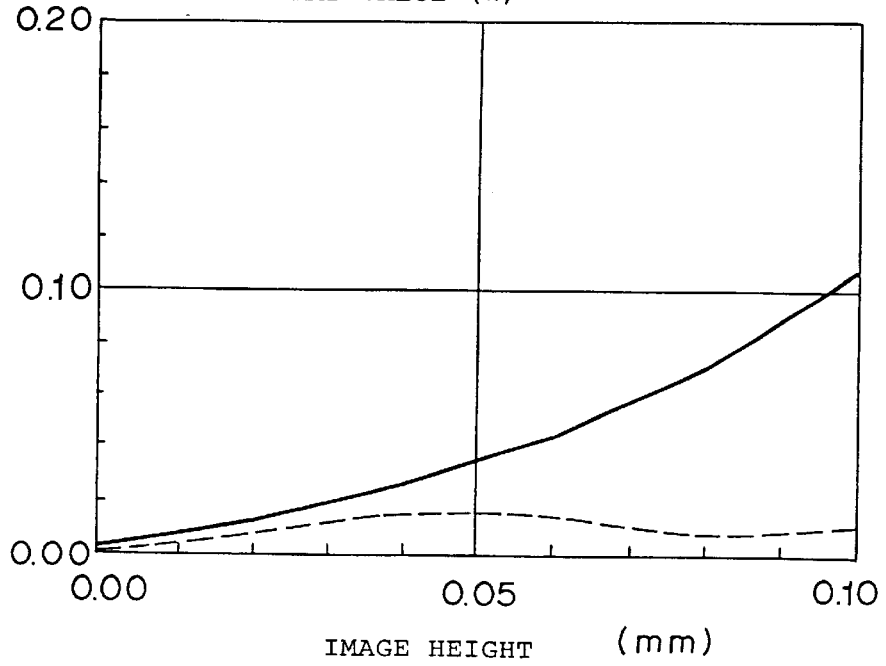
FIG. 11 is a characteristic diagram showing an off-axial wavefront aberration of an optical system for DVD in the fourth embodiment.

FIG. 10 shows an off-axial wavefront aberration characteristic of the optical system for CD. FIG. 11 shows an off-axial wavefront aberration characteristic of the optical system for DVD.

The objective lens 3 and the auxiliary lens 5 each having the same shape as in Example 4 were prepared by injection-molding a resinous material, and the optical device as in Example 4 was manufactured. In recording or reading DVD and CD by using the optical device, correct recording and reading could be obtained for both DVD and CD.

TABLE 8

| | |
|---|---|
| S2=10.00 | $a_{2.1}=0.1712213$ |
| S3=7.00 | $a_{2.2}=0.54074012$ |
| P=1.00 | $a_{4.1}=-0.0029217673$ |
| d=3.00 | $a_{4.2}=0.0026104218$ |
| n=1.522 | $a_{6.1}=0$ |
| $r_1=-3.206032$ | $a_{6.2}=0$ |
| $r_2=-0.8760008$ | $a_{8.1}=0$ |
| $k_1=-3.816491$ | $a_{8.2}=0$ |

TABLE 8-continued

| $k_2=-0.9999666$ | $a_{10.1}=0$ |
| | $a_{10.2}=0$ |

TABLE 9

| | Kinds of optical system | Kinds of aberration | Value (Calculated value) |
|---|---|---|---|
| Ex. 1 | Optical system for CD | Spherical aberration of third order | $-0.013\lambda$ |
| | | Off-axial coma aberration | $0.027\lambda$ |
| | Optical system for DVD | Spherical aberration of third order | $-0.001\lambda$ |
| | | Off-axial coma aberration | $0.001\lambda$ |
| Ex. 2 | Optical system for DVD | Spherical aberration of third order | $-0.001\lambda$ |
| | | Off-axial coma aberration | $0.005\lambda$ |
| | Optical system for CD | Spherical aberration of third order | $+0.010\lambda$ |
| | | Off-axial coma aberration | $0.017\lambda$ |
| Ex. 3 | Optical system for CD | Spherical aberration of third order | $-0.001\lambda$ |
| | | Off-axial coma aberration | $0.014\lambda$ |
| | Optical system for DVD | Spherical aberration of third order | $+0.001\lambda$ |
| | | Off-axial coma aberration | $0.002\lambda$ |
| Ex. 4 | Optical system for CD | Spherical aberration of third order | $-0.002\lambda$ |
| | | Off-axial coma aberration | $0.021\lambda$ |
| | Optical system for DVD | Spherical aberration of third order | $+0.001\lambda$ |
| | | Off-axial coma aberration | $0.011\lambda$ |

TABLE 10

| | Kinds of optical system | Lateral magnification | Diameter of clear aperture of objective lens 3 (mm) |
|---|---|---|---|
| Ex. 1 | Optical system for CD | $-0.1659$ | 4.60 |
| | Optical system for DVD | $-0.1265$ | 7.31 |
| Ex. 2 | Optical system for DVD | $-0.1268$ | 5.74 |
| | Optical system for CD | $-0.1630$ | 3.62 |
| Ex. 3 | Optical system for CD | $-0.1399$ | 3.95 |
| | Optical system for DVD | $-0.2373$ | 4.98 |
| Ex. 4 | Optical system for CD | $-0.2179$ | 3.79 |
| | Optical system for DVD | $-0.2567$ | 3.76 |

The optical device of the present invention can be manufactured by using two light sources, a single objective lens and a single auxiliary lens. Further, since it is unnecessary to move the light sources or the lens, a moving mechanism is not required whereby miniaturization and reduction of the weight can be achieved and productivity is improved.

Further, in the optical device of the present invention, an inclination or a shift of the light sources or the lenses from the optical axis with a lapse of time is small. In addition, an on-axial aberration and an off-axial aberration are excellent whereby the optical device of high precision and excellent performance is obtainable.

Obviously, numerous modifications and variations of the present invention are possible in light of the above teachings. It is therefore to be understood that within the scope of the appended claims, the invention may be practiced otherwise than as specifically described herein.

What is claimed is:

1. An optical device for recording or reading data in a data recording surface of an optical disk by collecting light from a light source providing light incident to the data recording surface through an objective lens, collected light being reflected from the data recording surface and received by a light receiving element through the objective lens, the optical device comprising:

a first light source and a second light source as the light source;

an auxiliary lens arranged such that said second light source, said auxiliary lens and said objective lens are arranged in the optical device so that the optical axis of said second light source, the optical axis of said auxiliary lens and the optical axis of said objective lens are fixed in a line; and a first optical disk and a second optical disk as the optical disk wherein the thickness of a transparent substrate of the first optical disk is different from the thickness of a transparent substrate of the second optical disk, wherein when data in respective data recording surfaces of the first and second optical disks are to be recorded or read, the data in the data recording surface of the first optical disk is recorded or read by collecting light from the first light source through the objective lens and the transparent substrate of the first optical disk in this order, and the data in the data recording surface of the second optical disk is recorded or read by collecting light from the second light source through the auxiliary lens, the objective lens and the transparent substrate of the second optical disk in this order, in response to recording or reading of the data in the data recording surface of the first optical disk, specifications of the objective lens are determined so that the absolute value in RMS value of a spherical aberration of the third order is 0.03 $\lambda_1$ or less and an off-axial coma aberration in an image height of 0.1 mm is 0.03 $\lambda_1$ or less, and in response to recording or reading of the data in the data recording surface of the second optical disk, specifications in a combination of the auxiliary lens and the objective lens are determined so that the absolute value in RMS value of a spherical aberration of the third order is 0.03 $\lambda_2$ or less and an off-axial coma aberration in an image height of 0.1 mm is 0.03 $\lambda_2$ or less where $\lambda_1$ represents a wavelength of the light from the first light source and $\lambda_2$ represents a wavelength of the light from the second light source.

2. The optical device according to claim 1, further comprising an optical material in addition to the objective lens and the auxiliary lens, wherein the data in the data recording surface of the first optical disk is recorded or read by collecting the light from the first light source using the optical material, the objective lens and the transparent substrate of the first optical disk in this order, and the data in the data recording surface of the second optical disk is recorded or read by collecting the light from the second light source using the auxiliary lens, the optical material, the objective lens and the transparent substrate of the second optical disk in this order.

3. The optical device according to claim 2, wherein the optical material is half mirror.

4. The optical device for recording or reading data in respective data recording surfaces of the first optical disk and the second optical disk each having a transparent substrate of different thickness according to claim 2, wherein the objective lens has optimized specifications so that the light from the first light source is well converged on the data recording surface of the first optical disk through the thickness of the transparent substrate of the first optical disk, and in a combination of the auxiliary lens and the objective lens, the auxiliary lens has optimized specifications so that the light from the second light source is well converged on the data recording surface of the second optical disk through the thickness of the transparent substrate of the second optical disk.

5. The optical device for recording or reading data in respective data recording surfaces of the first optical disk and the second optical disk each having a transparent substrate of different thickness according to claim 2, wherein:

when $t_1 < t_2$ where $t_1$ represents the thickness of the transparent substrate of the first optical disk and $t_2$ represents the thickness of the transparent substrate of the second optical disk, the objective lens has optimized specifications so that the light from the first light source is well converged on the data recording surface of the first optical disk through the thickness of the transparent substrate of the first optical disk, and in a combination of the auxiliary lens and the objective lens, the auxiliary lens has optimized specifications so that the light from the second light source is well converged on the data recording surface of the second optical disk through the thickness of the transparent substrate of the second optical disk.

6. The optical device according to claim 2, wherein 8 mm $\leq S_2 \leq 25$ mm, where $S_2$ represents a distance on the optical axis from the second light source to the surface of the auxiliary lens facing the second light source.

7. The optical device for recording or reading data in respective data recording surfaces of the first optical disk and the second optical disk each having a transparent substrate of different thickness according to claim 2, wherein at least one of the following Formulas (A) and (B) is satisfied:

$$0.05 \leq |\beta_1| \leq 0.3 \quad \text{(A)}$$

$$0.05 \leq |\beta_2| \leq 0.3 \quad \text{(B)}$$

where $\beta_1$ represents a lateral magnification of the objective lens in correspondence with a combination of the first light source and the transparent substrate of the first optical disk and $\beta_2$ represents a lateral magnification of the objective lens and the auxiliary lens in correspondence with a combination of the second light source and the transparent substrate of the second optical disk.

8. The optical device for recording or reading data in respective data recording surfaces of the first optical disk and the second optical disk each having a transparent substrate of different thickness according to claim 1, wherein the objective lens has optimized specifications so that the light from the first light source is well converged on the data recording surface of the first optical disk through the thickness of the transparent substrate of the first optical disk, and in a combination of the auxiliary lens and the objective lens, the auxiliary lens has optimized specifications so that the light from the second light source is well converged on the data recording surface of the second optical disk through the thickness of the transparent substrate of the second optical disk.

9. The optical device for recording or reading data in respective data recording surfaces of the first optical disk and the second optical disk each having a transparent substrate of different thickness according to claim 1, wherein:

when $t_1 < t_2$ where $t_1$ represents the thickness of the transparent substrate of the first optical disk and $t_2$ represents the thickness of the transparent substrate of the second optical disk, the objective lens has optimized specifications so that the light from the first light source is well converged on the data recording surface of the first optical disk through the thickness of the transparent substrate of the first optical disk, and in a combination of the auxiliary lens and the objective lens, the auxiliary lens has optimized specifications so that the light from the second light source is well converged on the data recording surface of the second optical disk through the thickness of the transparent substrate of the second optical disk.

10. The optical device according to claim 1, wherein 8 mm $\leq S_2 \leq 25$ mm, where $S_2$ represents a distance on the optical axis from the second light source to the surface of the auxiliary lens facing the second light source.

11. The optical device for recording or reading data in respective data recording surfaces of the first optical disk and the second optical disk each having a transparent substrate of different thickness according to claim 1, wherein at least one of the following Formulas (A) and (B) is satisfied:

$$0.05 \leq |\beta_1| \leq 0.3 \quad \text{(A)}$$

$$0.05 \leq |\beta_2| \leq 0.3 \quad \text{(B)}$$

where $\beta_1$ represents a lateral magnification of the objective lens in correspondence with a combination of the first light source and the transparent substrate of the first optical disk and $\beta_2$ represents a lateral magnification of the objective lens and the auxiliary lens in correspondence with a combination of the second light source and the transparent substrate of the second optical disk.

* * * * *

UNITED STATES PATENT AND TRADEMARK OFFICE
CERTIFICATE OF CORRECTION

PATENT NO. : 6,285,645 B1  
DATED : September 4, 2001  
INVENTOR(S) : Shimozono

Page 1 of 1

It is certified that error appears in the above-identified patent and that said Letters Patent is hereby corrected as shown below:

<u>Title page,</u>
The Notice information should read:
-- [*]   Notice:   This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer. --

Signed and Sealed this

Fourteenth Day of May, 2002

*Attest:*

JAMES E. ROGAN
*Attesting Officer*         *Director of the United States Patent and Trademark Office*